(12) United States Patent
Manes et al.

(10) Patent No.: US 11,670,961 B2
(45) Date of Patent: Jun. 6, 2023

(54) CLOSED LOOP CONTROL WIRELESS POWER TRANSMISSION SYSTEM FOR CONVEYANCE SYSTEM

(71) Applicant: Otis Elevator Company, Farmington, CT (US)

(72) Inventors: Enrico Manes, Feeding Hills, MA (US); Suman Dwari, Vernon, CT (US); Stephen Savulak, Woodbury, CT (US); Goran Djuknic, New York, NY (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 16/706,981

(22) Filed: Dec. 9, 2019

(65) Prior Publication Data

US 2020/0195046 A1   Jun. 18, 2020

Related U.S. Application Data

(60) Provisional application No. 62/779,513, filed on Dec. 14, 2018.

(51) Int. Cl.
*H02J 50/10* (2016.01)
*H02J 7/00* (2006.01)
(Continued)

(52) U.S. Cl.
CPC ............... *H02J 50/10* (2016.02); *B66B 7/00* (2013.01); *B66B 11/0226* (2013.01);
(Continued)

(58) Field of Classification Search
CPC .. B66B 5/00; B66B 1/00; B66B 11/00; B66B 19/00; B66B 13/00; B66B 3/00;
(Continued)

(56) References Cited

U.S. PATENT DOCUMENTS

| 5,118,997 A | 6/1992 | El-Hamamsy |
| 7,104,363 B2 | 9/2006 | Mori et al. |

(Continued)

FOREIGN PATENT DOCUMENTS

| CN | 101902081 A | 12/2010 |
| CN | 102649522 A | 8/2012 |

(Continued)

OTHER PUBLICATIONS

Maddalena et al. "A straightforward closed-loop Wireless Power Transfer battery charger", IECON 2016—42nd Annual Conference of the IEEE Industrial Electronics Society, Oct. 2016, Abstract Only, 2 Pages.

(Continued)

*Primary Examiner* — Elim Ortiz
(74) *Attorney, Agent, or Firm* — Cantor Colburn LLP

(57) ABSTRACT

According to a wireless power transfer system for wirelessly powering a conveyance apparatus of a conveyance system including: a wireless electrical power transmitter located along a side of the conveyance system in a first location; a power management system configured to control operation of the wireless electrical power transmitter; a wireless electrical power receiver located along a surface of the conveyance apparatus opposite the side; an energy storage device configured to receive electrical power from the wireless electrical power receiver; an energy storage device management system configured to monitor data of the energy storage device and the conveyance apparatus, the energy storage device management system being in wireless communication with the power management system, wherein the energy storage device management system is configured to transmit the data to the power management system and the power management system adjusts operation (Continued)

of the wireless electrical power transmitter in response to the data.

12 Claims, 2 Drawing Sheets

(51) Int. Cl.
    *H02J 50/80*           (2016.01)
    *B66B 11/02*           (2006.01)
    *B66B 11/04*           (2006.01)
    *B66B 7/00*            (2006.01)
    *H02J 50/12*           (2016.01)
    *H02J 50/90*           (2016.01)
    *H04B 5/00*            (2006.01)

(52) U.S. Cl.
    CPC ............... *B66B 11/04* (2013.01); *H02J 7/005* (2020.01); *H02J 7/00032* (2020.01); *H02J 7/0048* (2020.01); *H02J 50/80* (2016.02); *H02J 50/12* (2016.02); *H02J 50/90* (2016.02); *H04B 5/0037* (2013.01); *Y02B 50/00* (2013.01)

(58) Field of Classification Search
    CPC ....... B66B 7/00; B66B 2201/00; Y02B 50/00; H02J 50/00; H02J 50/40; H02J 50/50; H02J 50/70; H02J 50/90; H02J 50/10; H02J 50/80
    USPC ....... 320/108, 101, 109, 166, 128, 102, 140, 320/162, 163, 119, 145, 118, 126, 125, 320/149, 148; 187/212, 276, 285, 289, 187/293, 296, 297; 307/104
    See application file for complete search history.

(56) References Cited

U.S. PATENT DOCUMENTS

| | | | |
|---|---|---|---|
| 7,479,861 B2 | 1/2009 | Zepke et al. | |
| 8,064,825 B2 | 11/2011 | Onishi et al. | |
| 8,129,864 B2 | 3/2012 | Baarman et al. | |
| 8,222,860 B2 | 7/2012 | Kamijo et al. | |
| 8,803,476 B2 | 8/2014 | Vorenkamp et al. | |
| 8,878,393 B2 | 11/2014 | Kirby et al. | |
| 9,837,860 B2 | 12/2017 | Mccarthy et al. | |
| 2001/0017236 A1* | 8/2001 | Tominaga | B66B 1/30 187/290 |
| 2002/0023802 A1* | 2/2002 | Ayano | B66B 1/461 187/290 |
| 2003/0090238 A1 | 5/2003 | Wolin et al. | |
| 2007/0084673 A1* | 4/2007 | Smith | B66B 5/027 187/290 |
| 2015/0314984 A1* | 11/2015 | McCarthy | H02J 50/10 187/413 |
| 2017/0057780 A1 | 3/2017 | Nguyen et al. | |
| 2017/0057789 A1 | 3/2017 | Witczak et al. | |
| 2017/0057791 A1 | 3/2017 | Hsu et al. | |
| 2017/0057793 A1 | 3/2017 | Dwari et al. | |
| 2017/0341907 A1* | 11/2017 | Ferreira | B66B 7/06 |
| 2018/0057309 A1* | 3/2018 | Nikander | B66B 5/0093 |
| 2018/0251338 A1* | 9/2018 | Ratia | B66B 5/027 |

FOREIGN PATENT DOCUMENTS

| | | |
|---|---|---|
| CN | 107026510 A | 8/2017 |
| JP | 2015082963 A | 4/2015 |
| WO | 2009126963 A2 | 10/2009 |
| WO | 2010112675 A2 | 10/2010 |

OTHER PUBLICATIONS

The Extended European Search Report for Application No. 19215379.9-1017; Report dated Sep. 7, 2020; Report Received: Sep. 24, 2020; 7 pages.

European Search Report for Application No. 19215379.9; dated Oct. 6, 2022; 4 Pages.

Chinese Office Action for Application No. 201911278864.9; dated Feb. 7, 2023; 8 Pages.

* cited by examiner

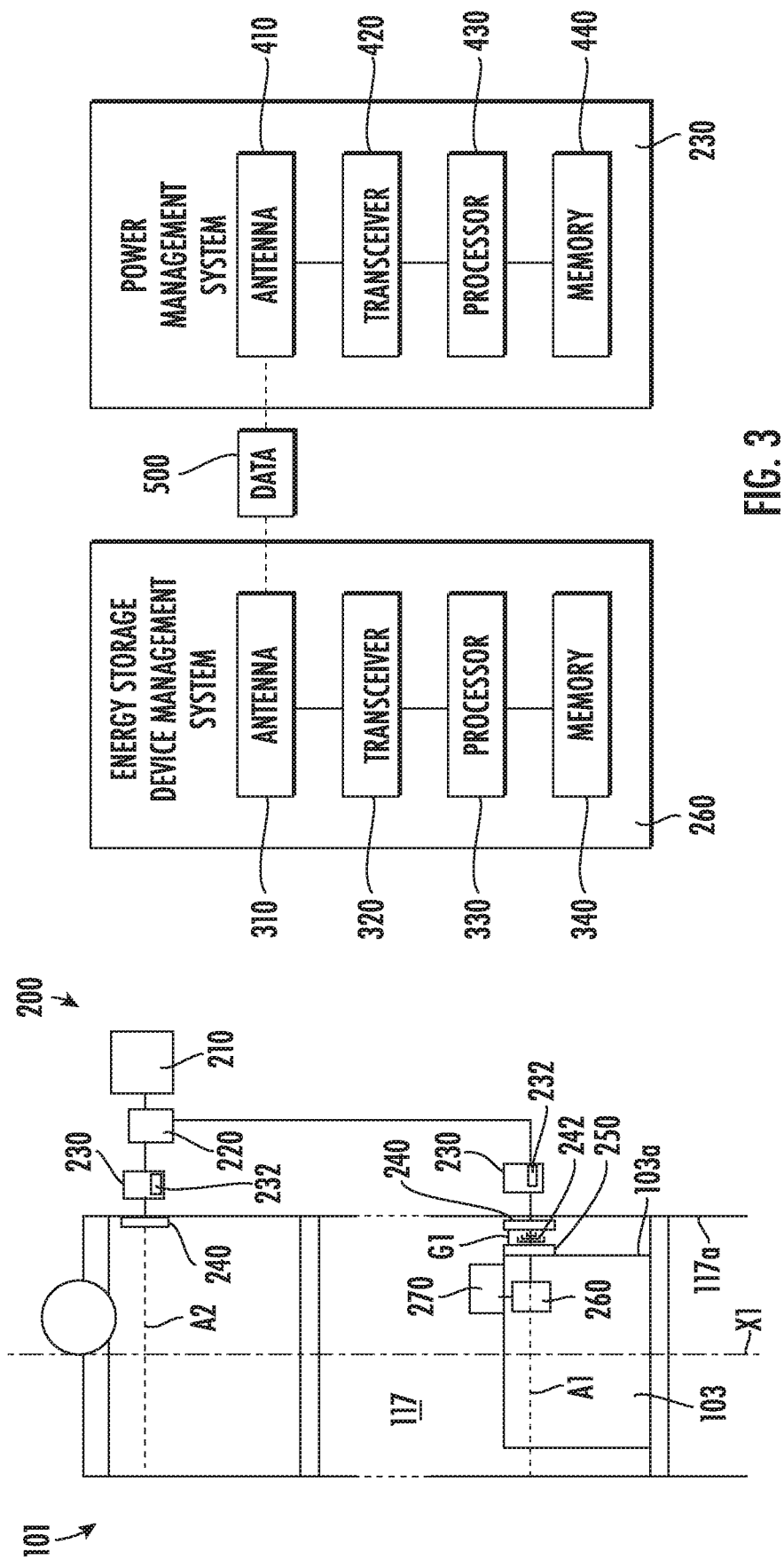

CLOSED LOOP CONTROL WIRELESS POWER TRANSMISSION SYSTEM FOR CONVEYANCE SYSTEM

CROSS-REFERENCE TO RELATED APPLICATIONS

This application claims the benefit of U.S. Provisional Application No. 62/779,513 filed Dec. 14, 2018, which is incorporated herein by reference in its entirety.

BACKGROUND

The embodiments herein relate to the field of conveyance systems, and specifically to a method and apparatus for powering a conveyance system.

Conveyance systems, such as, for example, elevator systems, escalator systems, and moving walkways require electric power for operation. Travelling cables typically connect an elevator car of the elevator system to a stationary power source to provide power to the elevator car. Travelling cables add expense, weight, and complexity to elevator car operation and installation, thus improved methods of powering elevator cars are desired.

BRIEF SUMMARY

According to a wireless power transfer system for wirelessly powering a conveyance apparatus of a conveyance system is provided. The wireless power transfer system including: a wireless electrical power transmitter located along a side of the conveyance system in a first location; a power management system configured to control operation of the wireless electrical power transmitter; a wireless electrical power receiver located along a surface of the conveyance apparatus opposite the side, the wireless electrical power receiver and the wireless electrical power transmitter being in a facing spaced relationship defining a gap therebetween when the wireless electrical power receiver is located proximate the first location; an energy storage device configured to receive electrical power from the wireless electrical power receiver; an energy storage device management system configured to monitor data of the energy storage device and the conveyance apparatus, the energy storage device management system being in wireless communication with the power management system, wherein the energy storage device management system is configured to transmit the data to the power management system and the power management system is configured to adjust operation of the wireless electrical power transmitter in response to the data.

In addition to one or more of the features described herein, or as an alternative, further embodiments may include that the conveyance system is an elevator system and the conveyance apparatus is an elevator car.

In addition to one or more of the features described herein, or as an alternative, further embodiments may include that the side is a wall of an elevator shaft of the elevator system.

In addition to one or more of the features described herein, or as an alternative, further embodiments may include that the wireless electrical power transmitter is configured to wirelessly transmit electrical power to the wireless electrical power receiver when the wireless electrical power receiver is located proximate the first location.

In addition to one or more of the features described herein, or as an alternative, further embodiments may include that the energy storage device is a battery system.

In addition to one or more of the features described herein, or as an alternative, further embodiments may include that the power management system is configured to adjust operation of the wireless electrical power transmitter in response to the data by adjusting electrical power being sent to the wireless electrical power transmitter.

In addition to one or more of the features described herein, or as an alternative, further embodiments may include that the data includes at least one of the state of charge of the energy storage device, a state of health of the energy storage device, a temperature of the energy storage device, dispatching of the conveyance apparatus, a location of the conveyance apparatus, and a location of the wireless electrical power receiver relative to the wireless electrical power transmitter.

In addition to one or more of the features described herein, or as an alternative, further embodiments may include that the energy storage device is a battery system.

In addition to one or more of the features described herein, or as an alternative, further embodiments may include that the power management system is configured to adjust operation of the wireless electrical power transmitter in response to the data by adjusting electrical power being sent to the wireless electrical power transmitter.

In addition to one or more of the features described herein, or as an alternative, further embodiments may include that the data includes at least one of the state of charge of the energy storage device, a state of health of the energy storage device, a temperature of the energy storage device, dispatching of the conveyance apparatus, a location of the conveyance apparatus, and a location of the wireless electrical power receiver relative to the wireless electrical power transmitter.

According to another embodiment a conveyance system is provided. The conveyance system including: a conveyance apparatus; and a wireless power transfer system for wirelessly powering the conveyance apparatus of the conveyance system, the wireless power transfer system including: a wireless electrical power transmitter located along a side of the conveyance system in a first location; a power management system configured to control operation of the wireless electrical power transmitter; a wireless electrical power receiver located along a surface of the conveyance apparatus opposite the side, the wireless electrical power receiver and the wireless electrical power transmitter being in a facing spaced relationship defining a gap therebetween when the wireless electrical power receiver is located proximate the first location; an energy storage device configured to receive electrical power from the wireless electrical power receiver; an energy storage device management system configured to monitor data of the energy storage device and the conveyance apparatus, the energy storage device management system being in wireless communication with the power management system, wherein the energy storage device management system is configured to transmit the data to the power management system and the power management system is configured to adjust operation of the wireless electrical power transmitter in response to the data.

In addition to one or more of the features described herein, or as an alternative, further embodiments may include that the conveyance system is an elevator system and the conveyance apparatus is an elevator car.

In addition to one or more of the features described herein, or as an alternative, further embodiments may include that the side is a wall of an elevator shaft of the elevator system.

In addition to one or more of the features described herein, or as an alternative, further embodiments may include that the wireless electrical power transmitter is configured to wirelessly transmit electrical power to the wireless electrical power receiver when the wireless electrical power receiver is located proximate the first location.

In addition to one or more of the features described herein, or as an alternative, further embodiments may include that the energy storage device is a battery system.

In addition to one or more of the features described herein, or as an alternative, further embodiments may include that the power management system is configured to adjust operation of the wireless electrical power transmitter in response to the data by adjusting electrical power being sent to the wireless electrical power transmitter.

In addition to one or more of the features described herein, or as an alternative, further embodiments may include that the data includes at least one of the state of charge of the energy storage device, a state of health of the energy storage device, a temperature of the energy storage device, dispatching of the conveyance apparatus, a location of the conveyance apparatus, and a location of the wireless electrical power receiver relative to the wireless electrical power transmitter.

In addition to one or more of the features described herein, or as an alternative, further embodiments may include that the energy storage device is a battery system.

In addition to one or more of the features described herein, or as an alternative, further embodiments may include that the power management system is configured to adjust operation of the wireless electrical power transmitter in response to the data by adjusting electrical power being sent to the wireless electrical power transmitter.

According to another embodiment, a wireless power transfer system for wirelessly powering a conveyance apparatus of a conveyance system is provided. The wireless power transfer system comprising: a wireless electrical power transmitter located along a side of the conveyance system in a first location; a power management system configured to control operation of the wireless electrical power transmitter; a wireless electrical power receiver located along a surface of the conveyance apparatus opposite the side, the wireless electrical power receiver and the wireless electrical power transmitter being in a facing spaced relationship defining a gap therebetween when the wireless electrical power receiver is located proximate the first location; and an energy storage device management system configured to monitor data of the conveyance apparatus, the energy storage device management system being in wireless communication with the power management system, wherein the energy storage device management system is configured to transmit the data to the power management system and the power management system is configured to adjust operation of the wireless electrical power transmitter in response to the data.

Technical effects of embodiments of the present disclosure include powering elevator cars of an elevator system wirelessly and controlling the flow of power via a closed loop architecture.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

FIG. 2 is a schematic illustration of a wireless power transfer system for the elevator system of FIG. 1, in accordance with an embodiment of the disclosure; and FIG. 3 is an enlarged view of wireless communication within the wireless power transfer system of FIG. 2, in accordance with an embodiment of the disclosure.

DETAILED DESCRIPTION

Figure 1:
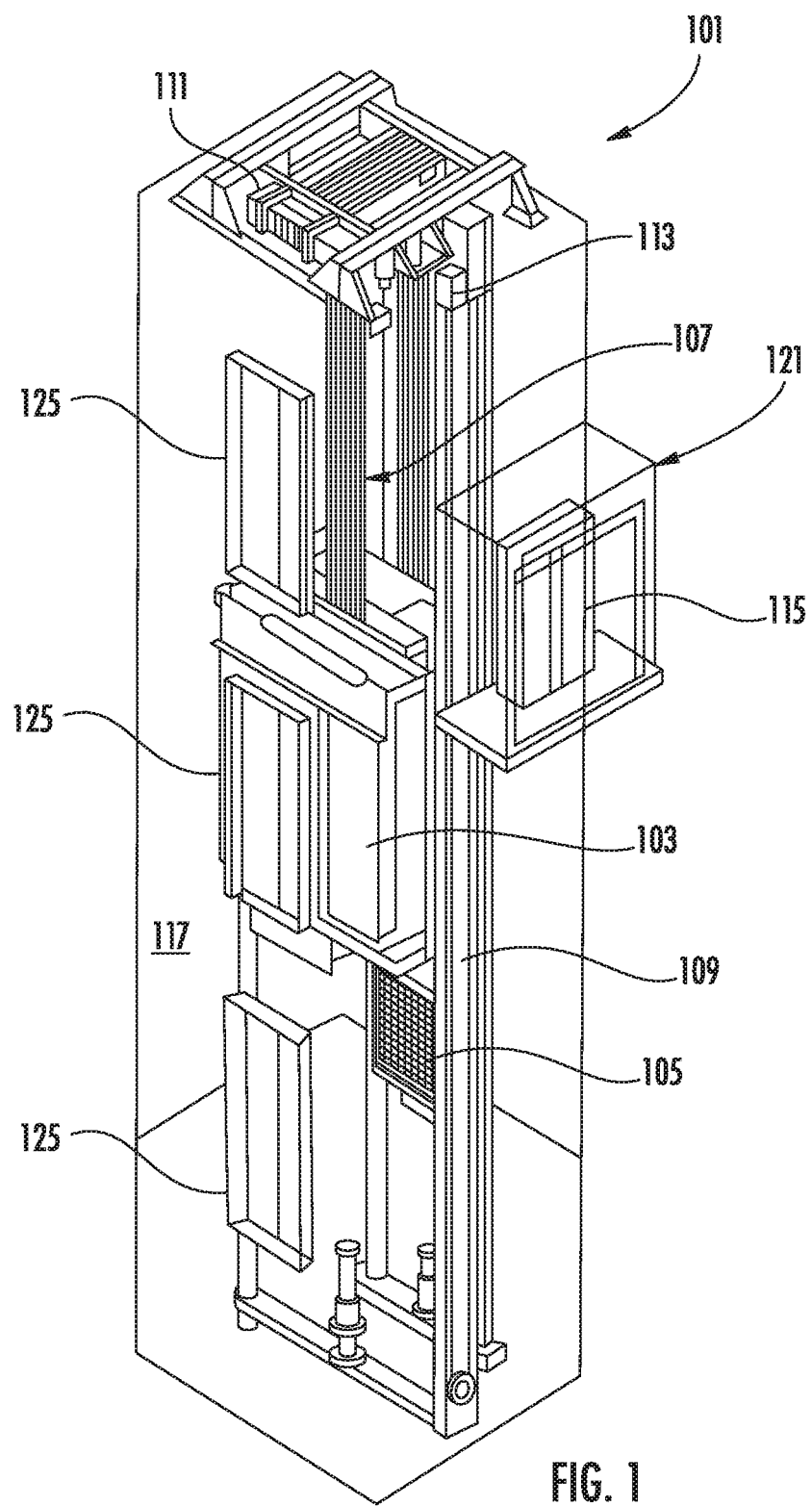
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

In other embodiments, the system comprises a conveyance system that moves passengers between floors and/or along a single floor. Such conveyance systems may include escalators, people movers, etc. Accordingly, embodiments described herein are not limited to elevator systems, such as that shown in FIG. 1. In one example, embodiments disclosed herein may be applicable conveyance systems such as an elevator system 101 and a conveyance apparatus of the conveyance system such as an elevator car 103 of the elevator system 101. In another example, embodiments disclosed herein may be applicable conveyance systems such as an escalator system and a conveyance apparatus of the conveyance system such as a moving stair of the escalator system.

Referring now to FIGS. 2-3 with continued reference to FIG. 1, a view of a wireless power transfer system 200 for use with the elevator system 101 of FIG. 1 is illustrated, in accordance with an embodiment of the present disclosure. It should be appreciated that, although particular systems are separately defined in the schematic block diagrams, each or any of the systems may be otherwise combined or separated via hardware and/or software. The wireless power transfer system 200 may include a power source 210, an AC/DC power converter 220, a power management system 230, a wireless electrical power transmitter 240, a wireless electrical power receiver 250, an energy storage device management system 260, and an energy storage device 270. An energy storage device 270 may not be required if energy harvesting is used.

The power source 210 may be a stationary power source, such as, for example electrical grid power, wind power, solar power, generator power, etc. The power source 210 may provide electrical power using alternating current (AC). The AC electrical power provided by the power source 210 may be three phase AC for higher power greater than about 3 kW. The AC/DC power converter 220 is configured to receive the AC electric power from the power source 210 and convert the AC electrical power into DC electrical power. The AC/DC power converter 220 is electrically connected to the power source 210. The electrical connection between the AC/DC power converter 220 and the power source 210 may be hardwired.

The power management system 230 is electrically connected to the AC/DC power converter 220. The electrical connection between the power management system 230 and the AC/DC power converter 220 may be hardwired. The power management system 230 operates as a power controller to supply the power needs of the elevator car 103 proximate a first location A1 and a second location A2. The first location A1 and the second location A2 may be planes through the elevator shaft 117 about perpendicular to an axis X1 that runs parallel to the elevator shaft 117. The power management system 230 controls switching, directing, or redirecting power to the elevator car 103 through one or more wireless power transmitters 240 as needed to satisfy the power requirements of the elevator car 103. Switching, directing, and redirecting may readily be accomplished employing a bus control switching device 232 of the power management system 230. The bus control switching device 232 may include, but not be limited to, electromechanical and solid state semiconductor switching devices including relays, contactors, solid state contactors as well as semiconductor switching devices such as transistors, FETs, MOSFETS, IGBT's, thyristors, SCR's, and the like. In addition, to facilitate and implement the functionality of the power management system 230, the voltages and frequencies of the power supplied by the power source 210 may be adjusted by the bus control switching device 232. The wireless power transmitters 240 may later adjust the frequency of the electrical power to satisfy the needs of the elevator car 103. The wireless electrical power transmitter 240 may be intelligent enough to identify the resonant frequency and power flow between and adjust frequencies to meet requested power flow. The intelligence could also be with the wireless electrical power transmitter 240 in the sensing of the current being transmitted. The wireless electrical power transmitter 240 may be intelligent enough to identify the resonant frequency and power flow between and adjust frequencies to meet requested power flow. The intelligence could also be with the wireless electrical power transmitter 240 in the sensing of the current being transmitted.

The wireless power transfer system 200 may include one or more wireless electrical power transmitters 240, as shown in FIG. 2. The electrical power transmitters 240 are electrically connected to the power management system 230. The electrical connection between the electrical power transmitter 240 and the power management system 230 may be hardwired. The wireless electrical power transmitter 240 may be located at different locations along a side of an elevator shaft 117. The side may be a wall 117a of the elevator shaft 117. In the example shown in FIG. 2, two wireless electrical power transmitter 240 are illustrated, including a wireless electrical power transmitter 240 is located at a first location A1 along a wall 117a of the elevator shaft 117 and a wireless electrical power transmitter 240 is located at a second location A2 along a wall 117a of the elevator shaft 117. The wireless electrical power transmitter 240 may be attached to the wall 117a or embedded in the wall 117a, or in any other desired arrangement. The wireless electrical power transmitter 240 may include a selected number of electrical coils configured to generate a magnetic field 242 when electrical power is run through the electrical coils. The electrical coils of the wireless electrical power transmitter 240 are not shown in FIG. 2 for simplification of the illustration.

The wireless power transfer system 200 may include one or more wireless electrical power receivers 250, as shown in FIG. 2. The wireless electrical wireless electrical power receivers 250 may be located at different locations along a surface 103a of the elevator car 103. The wireless electrical power receivers 250 may be attached to the surface 103a of the elevator car 103 or embedded in the surface 103a of the elevator car 103. The surface 103a of the elevator car 103 is located opposite the wall 117a of the elevator shaft 117 where the wireless electrical power transmitter 240 is located. Therefore, when the elevator car 103 and the wireless electrical power receivers 250 are located proximate the first location A1, the wireless electrical power receivers 250 and the wireless electrical power transmitter 240 at the first location A1 are in a facing spaced relationship and a gap G1 is formed therebetween. The gap G1 is formed between the wireless electrical power receivers 250 and the wireless electrical power transmitter 240 at the first location A1, as shown in FIG. 2. Likewise, when the elevator car 103 and the wireless electrical power receivers 250 are located proximate the second location A2, the wireless electrical power receivers 250 and the wireless electrical power transmitter 240 at the second location A2 are in a facing spaced relationship. The gap G1 will also be present between the wireless electrical power receivers 250 and the wireless electrical power transmitter 240 at the second location A2. The wireless electrical power receivers 250 may include a selected number of electrical coils configured to generate an electric power in response to the magnetic field 242 when the wireless electrical power receiver 250 is within the transmission range of the magnetic field 242 generated by the wireless electrical power transmitter 240. The electrical coils of the wireless electrical power receiver 250 are not shown in FIG. 2 for simplification of the illustration.

The electrical power receivers 250 are electrically connected to the energy storage device management system 260. The electrical connection between the electrical power receiver 250 and the energy storage device management system 260 may be hardwired. The energy storage device management system 260 is configured to condition the electrical power received from the electrical power receivers 250 and transfer the electrical power to the energy storage device 270 as needed. The energy storage device management system 260 monitors data 500 (see FIG. 3) of the energy storage device 270 and the elevator car 103 which includes at least one of the state of charge of the energy storage device 270, a state of health of the energy storage device 270, a temperature of the energy storage device 270, dispatching of the elevator car 103, a location of the elevator car 103, and a location of the wireless electrical power receiver 250 relative to the wireless electrical power transmitter 240. Examples of the energy storage device 270 may include a battery system (e.g., a battery or bank of batteries), fuel cells, flow battery, and others devices capable of storing and outputting electric energy that may be DC. In one embodiment, the energy storage device 270 may store potential energy rather than electrical energy and that potential energy may be utilized to create electrical energy for the elevator car 103a, 130b. The energy storage device 270 may include a battery system, which may employ multiple batteries organized into battery banks. The energy storage device 270 is electrically connected to the elevator car 103. The electrical connection between the energy storage device 270 and the elevator car 103 may be hardwired. The energy storage device 270 may power lighting inside the elevator car 103, fans, an emergency phone, climate controls, communication system, and/or the operating panel of the elevator car 103. The operating panel of the elevator car 103 may consists of floor buttons, a door open button, a door close button, other similar buttons, or may be a touchscreen.

Referring now to FIG. 3, with continued reference to FIGS. 1-2, a block diagram illustrating communication between the power management system 230 and energy storage device management system 260. It should be appreciated that, although particular systems are separately defined in the schematic block diagrams, each or any of the systems may be otherwise combined or separated via hardware and/or software.

The power management system 230 generally includes an antenna 410, a transceiver 420, a processor 430, and a memory 440. The transceiver 410 is capable of transmitting and receiving data to and from the energy storage management system 260. The transceiver 420 may, for instance, be a near field communication (NFC), Bluetooth, infrared, ZigBee, laser, infrared, or Wi-Fi transceiver, or another appropriate wireless transceiver. The antenna 410 is any antenna appropriate to the transceiver 420. The processor 430 and memory 440 are, respectively, data processing, and storage devices. The memory 440 may be RAM, EEPROM, or other storage medium where the processor 430 can read and write data 500.

The energy storage device management system 260 generally includes an antenna 310, a transceiver 320, a processor 330, and a memory 340. The transceiver 310 is capable of transmitting and receiving data to and from the power management system 230. The transceiver 320 may, for instance, be a near field communication (NFC), Bluetooth, infrared, ZigBee, laser, infrared, or Wi-Fi transceiver, or another appropriate wireless transceiver. The antenna 310 is any antenna appropriate to the transceiver 320. The processor 330 and memory 340 are, respectively, data processing, and storage devices. The memory 340 may be RAM, EEPROM, or other storage medium where the processor 330 can read and write data 500.

The energy storage device management system 260 may wirelessly transmit data 500 to the power management system 230 in a closed feedback loop. The data 500 may be transmitted periodically, intermittently, or in real time. The power management system 230 may adjust the wireless transmission of electrical power from the wireless electrical power transmitter 240 to the wireless electrical power receiver 250 in response to the data 500. The data 500 may depict performance and operation of the elevator car 103 and the energy storage device 270 including but not limited to the state of charge of the energy storage device 270, a state of health of the energy storage device 270, a temperature of the energy storage device 270, dispatching of the elevator car 103, a location of the elevator car 103, and a location of the wireless electrical power receiver 250 relative to the wireless electrical power transmitter 240. The power management system 230 may adjust the power and voltage of electricity being induced through the coils of the wireless electrical power transmitter 240 in response to the data 500. In one example, the power management system 230 may only induce an electrical current through the coils of the wireless electrical power transmitter 240 when the wireless electrical power receiver 250 is within a transmission range of the wireless electrical power transmitter 240. In another example, the power management system 230 may increase the electrical current through the coils of the wireless electrical power transmitter 240 when the energy storage device 270 is low on electrical power. The power management system 230 may dispatch the elevator car 103 to a location of the wireless electrical power transmitter 240 for charging when it determines that the energy storage device 270 is low on energy.

The term "about" is intended to include the degree of error associated with measurement of the particular quantity and/or manufacturing tolerances based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A wireless power transfer system for wirelessly powering a conveyance apparatus of a conveyance system, the wireless power transfer system comprising:
   a wireless electrical power transmitter located along a side of the conveyance system in a first location;
   a power management system configured to control operation of the wireless electrical power transmitter;
   a wireless electrical power receiver located along a surface of the conveyance apparatus opposite the side of the conveyance system, the wireless electrical power receiver and the wireless electrical power transmitter being in a facing spaced relationship defining a gap therebetween when the wireless electrical power receiver is located proximate the first location;
   an energy storage device configured to receive electrical power from the wireless electrical power receiver;
   an energy storage device management system configured to monitor a data of the energy storage device and the conveyance apparatus, the energy storage device management system being in wireless communication with the power management system,
   wherein the energy storage device management system is configured to transmit the data to the power management system and the power management system is configured to adjust operation of the wireless electrical power transmitter in response to the data, and
   wherein the data includes each of a state of health of the energy storage device, a temperature of the energy storage device, dispatching of the conveyance apparatus, a location of the conveyance apparatus and a location of the wireless electrical power receiver relative to the wireless electrical power transmitter, and
   wherein the power management system is configured to adjust a frequency and a voltage of electricity being induced through coils of the wireless electrical power transmitter based on the data.

2. The wireless power transfer system of claim 1, wherein the conveyance system is an elevator system and the conveyance apparatus is an elevator car.

3. The wireless power transfer system of claim 2, wherein the side of the conveyance system is a wall of an elevator shaft of the elevator system.

4. The wireless power transfer system of claim 1, wherein the wireless electrical power transmitter is configured to wirelessly transmit electrical power to the wireless electrical power receiver when the wireless electrical power receiver is located proximate the first location.

5. The wireless power transfer system of claim 1, wherein the energy storage device is a battery system.

6. The wireless power transfer system of claim 2, wherein the energy storage device is a battery system.

7. A conveyance system, comprising:
   a conveyance apparatus; and
   a wireless power transfer system for wirelessly powering the conveyance apparatus of the conveyance system, the wireless power transfer system comprising:
      a wireless electrical power transmitter located along a side of the conveyance system in a first location;
      a power management system configured to control operation of the wireless electrical power transmitter;
      a wireless electrical power receiver located along a surface of the conveyance apparatus opposite the side of the conveyance system, the wireless electrical power receiver and the wireless electrical power transmitter being in a facing spaced relationship defining a gap therebetween when the wireless electrical power receiver is located proximate the first location;
      an energy storage device configured to receive electrical power from the wireless electrical power receiver;
      an energy storage device management system configured to monitor a data of the energy storage device and the conveyance apparatus, the energy storage device management system being in wireless communication with the power management system,
      wherein the energy storage device management system is configured to transmit the data to the power management system and the power management system is configured to adjust operation of the wireless electrical power transmitter in response to the data, and
      wherein the data includes each of a state of health of the energy storage device, a temperature of the energy storage device, dispatching of the conveyance apparatus, a location of the conveyance apparatus and a location of the wireless electrical power receiver relative to the wireless electrical power transmitter, and
      wherein the power management system is configured to adjust a frequency and a voltage of electricity being induced through coils of the wireless electrical power transmitter based on the data.

8. The system of claim 7, wherein the conveyance system is an elevator system and the conveyance apparatus is an elevator car.

9. The system of claim 7, wherein the side of the conveyance system is a wall of an elevator shaft of the elevator system.

10. The system of claim 7, wherein the wireless electrical power transmitter is configured to wirelessly transmit electrical power to the wireless electrical power receiver when the wireless electrical power receiver is located proximate the first location.

11. The system of claim 7, wherein the energy storage device is a battery system.

12. The system of claim 8, wherein the energy storage device is a battery system.

\* \* \* \* \*